US012641182B1

(12) United States Patent (10) Patent No.: US 12,641,182 B1

Wilson et al. (45) Date of Patent: May 26, 2026

(54) REPORTING DELAY MITIGATION APPARATUS, SYSTEM, AND METHODS THEREOF

(71) Applicant: MarketSpark, Inc., San Diego, CA (US)

(72) Inventors: Charles Wilson, Hampton Cove, AL (US); Patrick Burns, Libertyville, IL (US)

(73) Assignee: MarketSpark, Inc., Bannockburn, IL (US)

( * ) Notice: Subject to any disclaimer, the term of this patent is extended or adjusted under 35 U.S.C. 154(b) by 220 days.

(21) Appl. No.: 18/490,129

(22) Filed: Oct. 19, 2023

Related U.S. Application Data

(63) Continuation of application No. 18/474,195, filed on Sep. 25, 2023, now abandoned.

(51) Int. Cl.
H04M 7/12 (2006.01)

(52) U.S. Cl.
CPC ................................... H04M 7/129 (2013.01)

(58) Field of Classification Search
CPC ...... H04M 7/129; H04M 11/04; H04M 7/006; H04M 1/003; H04M 11/00
See application file for complete search history.

(56) References Cited

U.S. PATENT DOCUMENTS 5,737,391 A * 4/1998 Dame .................... G08B 29/08
                                                              379/51
7,111,070 B2 * 9/2006 Bennett ................. H04L 69/324
                                                              709/248

7,262,690 B2 * 8/2007 Heaton ................ G08B 25/009
                                                              340/506
7,734,020 B2 6/2010 Elliot
8,005,195 B2 8/2011 Luneau
8,018,337 B2 * 9/2011 Jones ....................... G08B 1/08
                                                              340/657
8,248,231 B2 * 8/2012 Taylor .................... A61B 5/002
                                                              128/903

(Continued)

FOREIGN PATENT DOCUMENTS

GB          2465833 A * 6/2010 ............... H04L 9/40
WO    WO-2015013756 A1 * 2/2015 ............ H04M 7/122

*Primary Examiner* — Akelaw Teshale
(74) *Attorney, Agent, or Firm* — Bradley Arant Boult Cummings LLP; Stephen H. Hall; Alex H. Huffstutter

(57) ABSTRACT

A monitoring system for mitigating reporting delays between a customer device and a central monitoring station (CMS), for example, over a public switched telephone network (PSTN) may include a message tone detector, an acknowledgement tone detector, an acknowledgement tone generator and a processor coupled to each of the message tone detector, the acknowledgement tone detectors and the acknowledgement tone generator. The message tone detector may be configured to monitor one or more messages sent from the customer device to the CMS. The acknowledgement tone detector may be configured to monitor one or more acknowledgements sent from the CMS to the customer device in response to each of the one or more messages, respectively. The acknowledgement tone generator may be configured to generate and transmit one or more additional acknowledgements to the customer device when two consecutive messages of the one or more messages are substantially similar.

20 Claims, 6 Drawing Sheets

(56) References Cited

U.S. PATENT DOCUMENTS

| | | | |
|---|---|---|---|
| 8,937,658 B2 | 1/2015 | Hicks, III | |
| 9,054,893 B2 | 6/2015 | Elliot | |
| 9,462,135 B2 * | 10/2016 | Smith | G08B 25/006 |
| 9,674,681 B2 | 6/2017 | Bear | |
| 9,761,119 B1 * | 9/2017 | Trundle | G08B 29/16 |
| 10,079,839 B1 | 9/2018 | Bryan | |
| 10,110,750 B2 * | 10/2018 | Johan | H04M 7/122 |
| 10,447,502 B2 * | 10/2019 | Hederstierna | H04L 12/2807 |
| 10,986,555 B1 * | 4/2021 | Moshayedi | H04W 12/033 |
| 11,240,276 B2 | 2/2022 | Russo | |
| 11,722,896 B2 | 8/2023 | Dawes | |
| 12,250,339 B2 | 3/2025 | Moshayedi | |
| 2004/0086093 A1 | 5/2004 | Schranz | |
| 2005/0008004 A1 | 1/2005 | Williams | |
| 2009/0325559 A1 * | 12/2009 | Blum | H04M 11/04 |
| | | | 455/415 |
| 2011/0316688 A1 | 12/2011 | Ranjan | |
| 2012/0027010 A1 | 2/2012 | Elliot | |
| 2013/0076510 A1 | 3/2013 | Bear | |
| 2019/0215729 A1 * | 7/2019 | Oyman | H04L 65/1016 |
| 2020/0327797 A1 | 10/2020 | Johan | |
| 2021/0099500 A1 | 4/2021 | Russo | |
| 2021/0233380 A1 | 7/2021 | Reitman | |

* cited by examiner

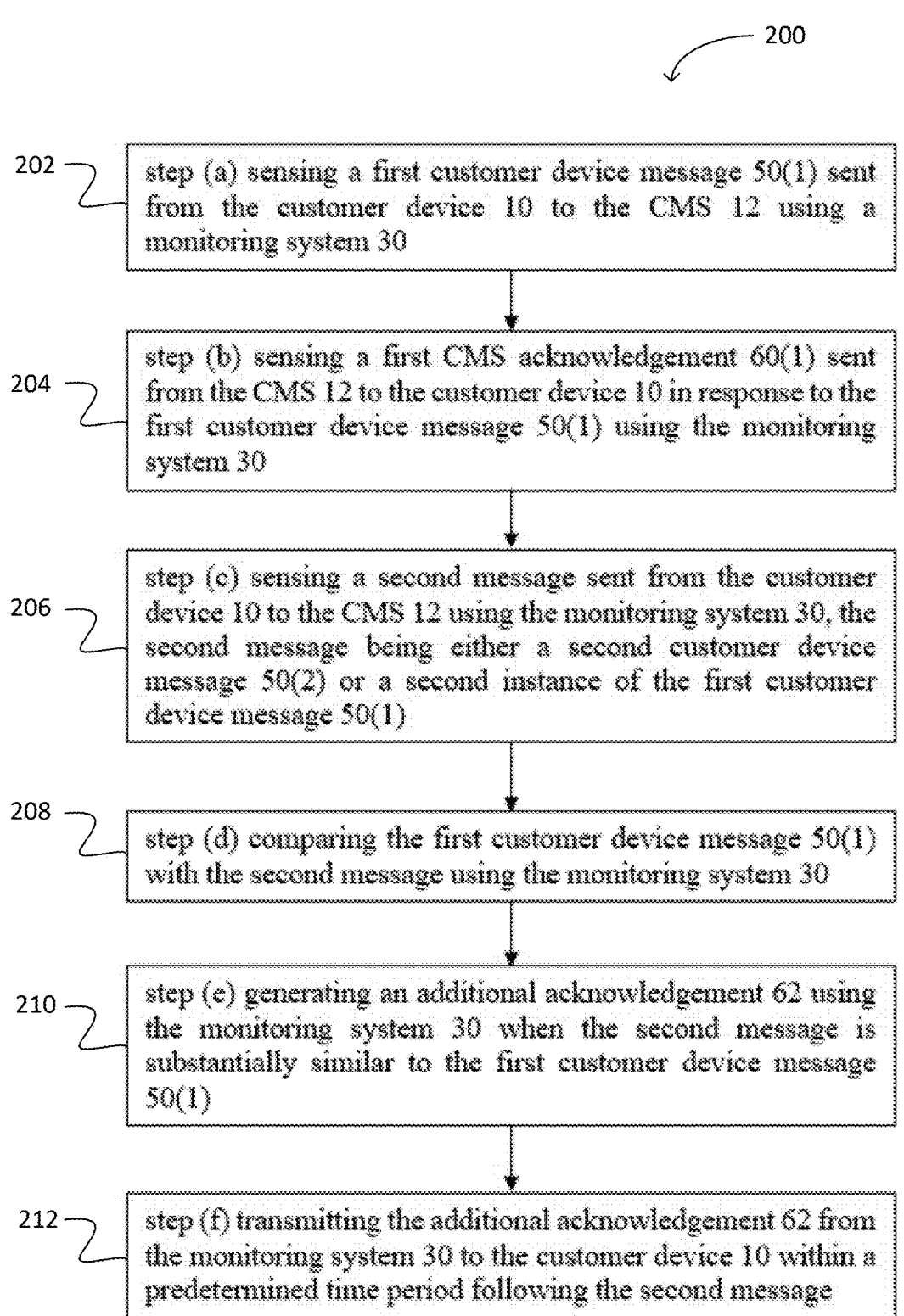

200 step (a) sensing a first customer device message 50(1) sent from the customer device 10 to the CMS 12 using a monitoring system 30

202 step (b) sensing a first CMS acknowledgement 60(1) sent from the CMS 12 to the customer device 10 in response to the first customer device message 50(1) using the monitoring system 30

204 step (c) sensing a second message sent from the customer device 10 to the CMS 12 using the monitoring system 30, the second message being either a second customer device message 50(2) or a second instance of the first customer device message 50(1)

206 step (d) comparing the first customer device message 50(1) with the second message using the monitoring system 30

208 step (e) generating an additional acknowledgement 62 using the monitoring system 30 when the second message is substantially similar to the first customer device message 50(1)

210 step (f) transmitting the additional acknowledgement 62 from the monitoring system 30 to the customer device 10 within a predetermined time period following the second message

REPORTING DELAY MITIGATION APPARATUS, SYSTEM, AND METHODS THEREOF

CROSS-REFERENCES TO RELATED APPLICATIONS

This application is a continuation of U.S. Non-Provisional patent application Ser. No. 18/474,195 filed Sep. 25, 2023, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to public switched telephone network (PSTN) communications between customer devices, such as, security and/or fire alarm panels, and a central monitoring station (CMS). More particularly, the present disclosure pertains to latency mitigation devices, systems, and methods for said PSTN communications.

2. Description of the Prior Art

Presently, a vast array of devices, the majority of which encompass intrusion and fire alarm panels, are in operational use across the globe. These devices rely on one or more conventional analog phone lines, often referred to as Plain Old Telephone Service (POTS), to transmit event and status data to a central receiving unit situated at a Central Monitoring Station (CMS).

Notably, the "Digital Communication Standard—Ademco® Contact ID Protocol—for Alarm System Communications, SIA DC-05," more commonly recognized as Contact ID, stands as one of the predominant methodologies employed for conveying event and status particulars. The Contact ID protocol utilizes a combination of single-frequency and dual-frequency tones to initiate, transmit, and confirm the data exchanged between the device and the CMS. However, this protocol imposes stringent temporal parameters on message transmission and acknowledgment of message receipt by the CMS. While these constraints harmonize well with the conventional Public Switched Telephone Network, which employs circuits such as POTS lines or isochronous time division multiplexed (TDM) circuits like DS-3 or DS-1 (also known as T3 or T1, respectively), the advent of packetized voice technologies such as Voice over Internet Protocol (VoIP) on both wired and wireless networks introduces additional latency to the communication pathway. This often leads to disruptions in the seamless information exchange envisioned by the Contact ID protocol. As the prevalence of VoIP and similar packet voice technologies surges, driven by the phasing out of POTS lines by traditional telecommunications companies, the challenge of mitigating these disruptions becomes a pressing concern within the intrusion and fire alarm panel industries. This issue further affects protocols other than Contact ID, such as, for example, 3/1, 3+1, 4/2, 4+2, Ademco Express, and other tone-based protocols.

BRIEF SUMMARY

In view of at least some of the above-referenced problems in conventional PSTN communication implementations between a customer device and a central monitoring station (CMS), an exemplary object of the present disclosure may be to provide an improved apparatus, system, and method for overcoming reporting delays between the customer device and the CMS.

An exemplary such monitoring system may desirably feature a message tone detector configured to monitor one or more messages sent from the customer device to the CMS over the PSTN. The exemplary such monitoring system may further feature an acknowledgement tone detector configured to monitor one or more acknowledgements sent from the CMS to the customer device in response to each of the one or more messages, respectively. The exemplary such monitoring system may further feature an acknowledgement tone generator configured to generate and transmit one or more additional acknowledgements to the customer device when two consecutive messages of the one or more messages are substantially similar.

In various embodiments, a monitoring system as disclosed herein may preferably be configured to compare consecutive messages of the one or more messages. The monitoring system may further preferably be configured to control the acknowledgement tone generator based on the comparison to cause the transmission of the one or more additional acknowledgements within a predetermined time period following the second customer device message.

In a particular embodiment, an exemplary monitoring system as disclosed herein may include a message tone detector, an acknowledgement tone detector, an acknowledgement tone generator, and a processing unit. The message tone detector may be configured to monitor one or more messages sent from the customer device to the CMS over the PSTN. The acknowledgement tone detector may be configured to monitor one or more acknowledgements sent from the CMS to the customer device in response to each of the one or more messages, respectively. The acknowledgement tone generator may be configured to generate and transmit one or more additional acknowledgements to the customer device. The processing unit may be configured to receive the monitored one or more messages and the monitored one or more acknowledgements. The processing unit may further be configured to cause the acknowledgement tone generator to generate and transmit the one or more additional acknowledgements to the customer device when two consecutive messages of the one or more messages are substantially similar.

In an exemplary aspect according to the above-referenced embodiment, the two consecutive messages comprise a first message and a resent first message. The processing unit may be configured to save the first message to a storage medium of the monitoring system, recall the first message from the storage medium, and compare the first message to the resent first message.

In another exemplary aspect according to the above-referenced embodiment, the one or more acknowledgements may include a first acknowledgement sent from the CMS to the customer device in response to each of the first message and the resent first message. The one or more additional acknowledgements may include a first additional acknowledgement sent from the acknowledgement tone generator to the customer device in response to the resent first message.

In another exemplary aspect according to the above-referenced embodiment, the processing unit may be configured to clear the first message from the storage medium upon receiving the first acknowledgement from the CMS followed by a second message of the one or more messages from the customer device, wherein the second message being is different than the first message.

In another exemplary aspect according to the above-referenced embodiment, the processing unit may be configured to clear the first message from the storage medium upon receiving the first additional acknowledgement from the acknowledgement tone generator.

In another exemplary aspect according to the above-referenced embodiment, the processing unit may be configured to save a first acknowledgement to the storage medium and to direct the acknowledgement tone generator to generate and transmit a first additional acknowledgement to the customer device in response to the resent first message.

In another exemplary aspect according to the above-referenced embodiment, the first additional acknowledgement may be substantially similar to the first acknowledgement saved to the storage medium.

In another exemplary aspect according to the above-referenced embodiment, the monitoring system may be coupled to the PSTN closer to the customer device than to the CMS.

In another exemplary aspect according to the above-referenced embodiment, the monitoring system may be positioned such as to have a low-latency path to the customer device.

In another exemplary aspect according to the above-referenced embodiment, the monitoring system may be defined as a device containing the components of the monitoring system.

In another embodiment, an exemplary method as disclosed herein may include (a) sensing a first customer device message sent from the customer device to the CMS using a monitoring system; (b) sensing a first CMS acknowledgement sent from the CMS to the customer device in response to the first customer device message using the monitoring system; (c) sensing a second message sent from the customer device to the CMS using the monitoring system, the second message being either a second customer device message or a second instance of the first customer device message; (d) comparing the first customer device message with the second message using the monitoring system; (e) generating an additional acknowledgement using the monitoring system when the sensed second message is substantially similar to the first customer device message; and (f) transmitting the additional acknowledgement from the monitoring system to the customer device within a predetermined time period following the second message.

In an exemplary aspect according to the above-referenced embodiment, between step (a) and step (b), the method may further include storing the first customer device message on a storage medium of the monitoring system.

In another exemplary aspect according to the above-referenced embodiment, step (d) of the method may further include retrieving the first customer device message from the storage medium using a processor of the monitoring system.

In another exemplary aspect according to the above-referenced embodiment, the method may further include clearing the first customer device message from the storage medium following step (f).

In another exemplary aspect according to the above-referenced embodiment, the method may further include clearing the first customer device message from the storage medium following step (d) when the second message is different from the first customer device message; and storing the second message on the storage medium as the second customer device message.

In another exemplary aspect according to the above-referenced embodiment, the method may further include sensing a third message sent from the customer device to the CMS using the monitoring system, the third message being either a third customer device message or a second instance of the second customer device message; comparing the second customer device message with the third message using the monitoring system; generating the additional acknowledgement using the monitoring system when the third message is substantially similar to the second customer device message; and transmitting the additional acknowledgement from the monitoring system to the customer device within the predetermined time period following the third message.

In another exemplary aspect according to the above-referenced embodiment, the method may further include sensing a plurality of additional messages and performing steps similar to those with regard to the first customer device message, the second message, and the third message.

In another exemplary aspect according to the above-referenced embodiment, step (d) of the method may be performed using a processor of the monitoring system.

In another exemplary aspect according to the above-referenced embodiment, the additional acknowledgement of the method may be substantially similar to the first CMS acknowledgement.

In another exemplary aspect according to the above-referenced embodiment, the monitoring system of the method may be coupled to a transmission line of the PSTN between the customer device and the CMS.

In another exemplary aspect according to the above-referenced embodiment, the predetermined time period of the method may be less than approximately 1.25 seconds beginning upon transmission of the second message from the customer device.

BRIEF DESCRIPTION OF THE SEVERAL VIEWS OF THE DRAWINGS

FIG. 8 is a flowchart of a method of overcoming latency issues between a customer device and a central monitoring station (CMS) over a public switched telephone network (PSTN) using the monitoring system of FIG. 1 in accordance with the present disclosure.

DETAILED DESCRIPTION

Figure 1:
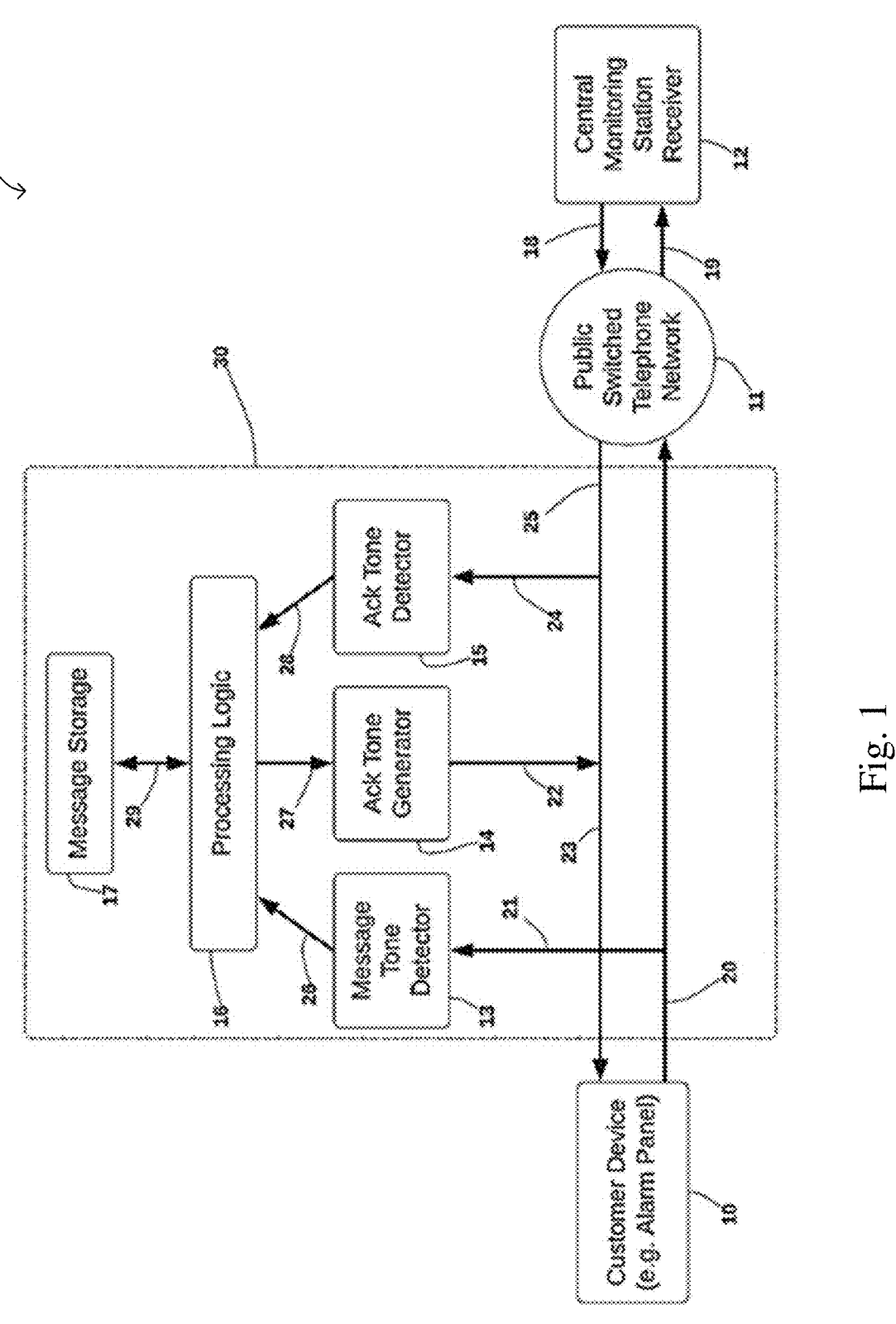
FIG. 1 is a block diagram of a monitoring system in accordance with the present disclosure.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," "optional embodiment" or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

The term "substantially similar" refers to a state or condition in which two or more elements, components, structures, or phenomena exhibit a high degree of likeness or resemblance to each other, with variations that are inconsequential or non-material in nature. "Substantially similar" implies a level of correspondence or equivalence that, while not necessarily absolute or identical in every aspect, is such that the distinctions or differences between the compared elements do not significantly affect their intended function, purpose, or result. The degree of similarity may vary depending on the specific context and requirements of the invention disclosed herein but generally denotes a level of resemblance that is sufficient to achieve the desired objectives or outcomes without introducing substantial deviations or variations.

Multiple elements of the same or a similar type may be referred to as "Elements 2(1)-(n)" where n may include a number. Referring to one of the elements as "Element 2" refers to any single element of the Elements 2(1)-(n). Additionally, referring to different elements "First Elements 2(1)-(n)" and "Second Elements 4(1)-(n)" does not necessarily mean that there must be the same number of First Elements as Second Elements and is equivalent to "First Elements 2(1)-(n)" and "Second Elements (1)-(m)" where m is a number that may be the same or may be a different number than n.

Referring to FIG. 1, a system 1 is shown including a monitoring system 30. The system 1 may include a customer device 10 and a central monitoring system (CMS) 12 linked together over a public switched telephone network (PSTN) 11. The monitoring system 30 may also be referred to herein as a device 30 or a monitoring device 30. The CMS 12 may also be referred to herein as a CMS receiver 12. In certain optional embodiments, the monitoring system 30 may comprise or be defined as a self-contained device.

In its simplest form, the monitoring system 30 listens for a message from the customer device 10 and then listens for an acknowledgement of that message from the CMS 12. Then, if the monitoring system 30 hears the same message again from the customer device 10 (before any other message) then the monitoring system 30 will replay the acknowledgement previously sent from the CMS 12, in response to the first message, very quickly (before receiving the actual acknowledgement from the CMS 12 associated with the repeated message), thus taking advantage of a "loophole" in the protocol (e.g., overriding the protocol) in which the sender (e.g., customer device 10) of the message will repeat the same message several times before stopping. As long as the customer device 10 receives a valid acknowledgement during the process of repeating, then the customer device 10 accepts the message as sent successfully and continues to the next message in the outgoing message queue of the customer device 10. To better understand the specifics of the present disclosure, a brief explanation of how the Contact ID protocol and other tone-based protocols (e.g., 3/1, 3+1, 4/2, 4+2, Ademco Express, etc.) operate.

Figure 2:
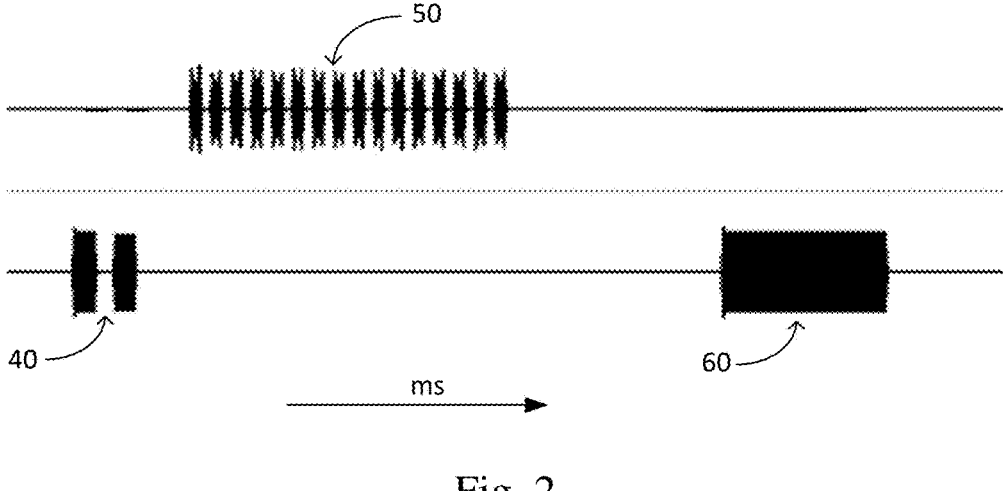
FIG. 2 is a graph of an embodiment of a successful contact ID waveform in accordance with the present disclosure.
Figure 3:
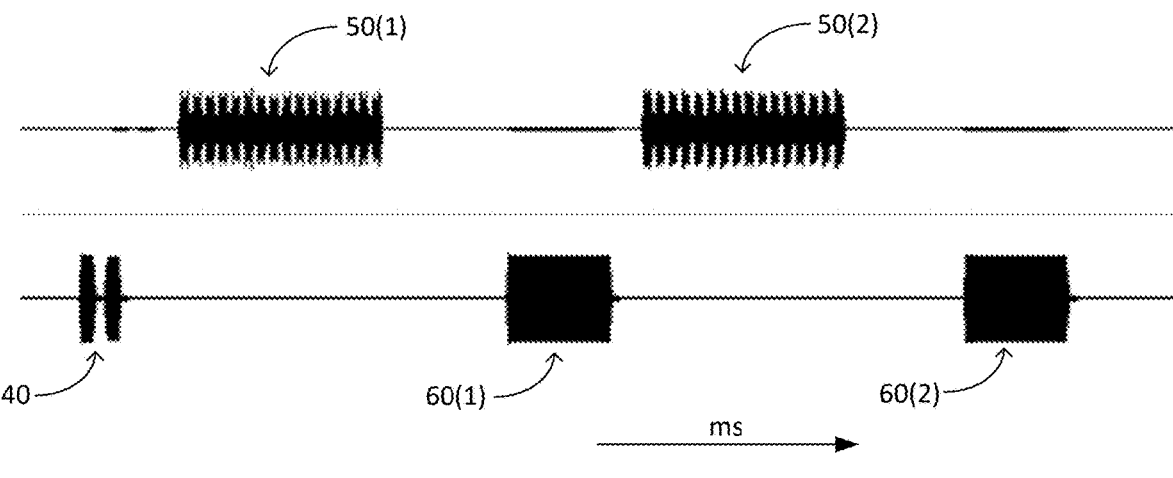
FIG. 3 is a graph of an embodiment of a successful contact ID waveform in accordance with the present disclosure.
Figure 4:
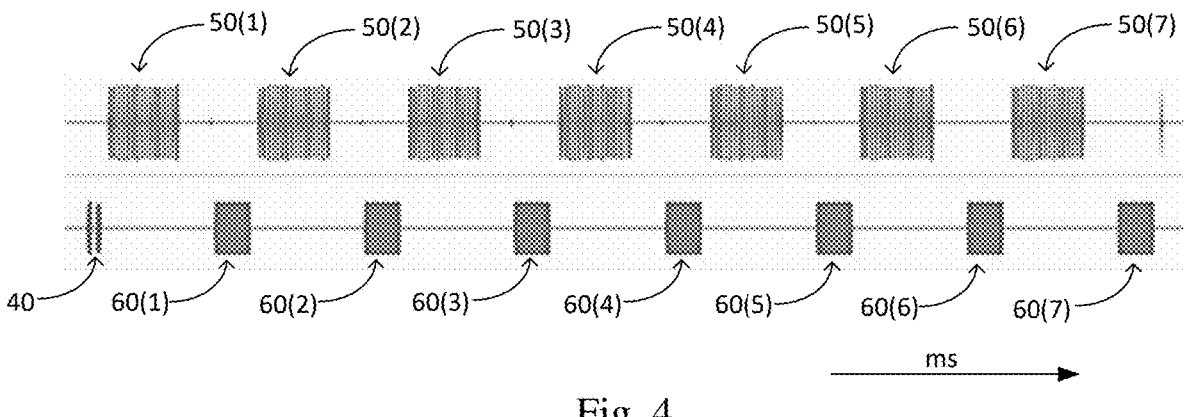
FIG. 4 is a graph of an embodiment of a successful contact ID waveform in accordance with the present disclosure.

Referring to FIG. 2, in the Contact ID reporting format, a customer device 10 (e.g. alarm panel) dials the CMS 12 and waits for a handshake tone sequence 40. The handshake tone sequence 40 may also be referred to herein as a handshake 40. After receiving the handshake 40, the customer device 10 sends a message tone sequence 50 and waits to receive an acknowledgement tone sequence 60 ("ack", also known as a kiss-off) from the CMS receiver. The message tone sequence 50 may also be referred to herein as a message 50 or a message block 50. The acknowledgement tone sequence 60 may also be referred to herein as an acknowledgement 60. In certain optional embodiments, a plurality of messages (e.g., 50(1), 50(2), etc.) may be sent, each followed by an associated acknowledgement (e.g., 60(1), 60(2), etc.) as illustrated in FIGS. 3-4. If the customer device 10 doesn't receive the acknowledgement 60, then it sends its message 50 again. This process repeats until the customer device 10 receives the acknowledgement 60 or sends a predetermined number of the same message (e.g., four) without receiving the acknowledgement 60, at which time the customer device 10 hangs up. The customer device 10 will then continue to call the CMS 12 attempting to deliver its message 50. If the customer device 10 successfully receives the acknowledgement 60, then it sends another message (e.g., 50(2), etc.) or hangs up.

If the CMS 12 answers the call, sends its handshake 40, but then doesn't receive the start of a message 50, then it may send another handshake 40. It may also send the handshake of a different alarm reporting protocol, or the CMS 12 may just hang up the call.

The three basic elements of the communications session are the handshake 40 from the CMS 12, the message 50 from the customer device 10, and the acknowledgement 60 from the CMS 12. The handshake tone sequence 40 is sent by the CMS 12 to signal to the customer device 10 that the communication channel is ready. The handshake tone sequence 40 may consist of a 100 ms long 1400 Hz tone, a pause of 100 ms, then a 100 ms long 2300 Hz tone. In other optional embodiment, the timing and frequency of the handshake 40 may be different.

The message blocks (e.g., 50(1), 50(2), etc.) are sent by the customer device 10 for each message in the customer device's 10 queue. Each message block may be sent 250 ms (250 ms min, 300 ms max) after the end of the handshake 40 (or after an acknowledgement 60). Each message block may consist of 16 standard dual-tone multi-frequency signaling (DTMF) tones, as known to those of ordinary skill in the art. The timing of each of the tones may be "on" for 50 ms (e.g., 50 ms min, 60 ms max) and "off" for 50 ms (e.g., 50 ms min, 60 ms max).

After sending its message 50, the customer device 10 may wait for 1.25 seconds for the start of an acknowledgement 60 from the CMS 12. In some embodiments, the customer device may wait less than 1.25 second, for example, 1.1 seconds, 1 second, 900 milliseconds, 800 milliseconds, 700 milliseconds, 600 milliseconds, 500 milliseconds, or the like. If the start of an acknowledgement 60 is detected, the customer device 10 may continue timing the tone, even if the inter-message time expires. The panel may generally be required to detect a minimum of 400 ms of the acknowledgement 60 for it to be considered valid. If an acknowledgement 60 is detected, the customer device 10 should wait for the tone to end and then wait an additional 250 ms (e.g., 250 ms min, 300 ms max) before beginning the next message (e.g., 50(2), etc.). If no acknowledgement 60 is received, the customer device 10 may repeat the message after the expiration of the 1.25 second 'inter-message interval'.

The acknowledgement 60 (also known as a 'Kissoff Tone') from the CMS 12 is used to tell the customer device 10 that the message has been received successfully. The frequency of the acknowledgement 60 may be 1400 Hz±3% and may be sent by the CMS 12 for a minimum of 750 ms and a maximum of 1 second. The duration and frequency of the acknowledgement 60 may be different in other embodiments.

As illustrated in FIG. 2, a basic type of successful call may include a handshake 40, a message 50, and an acknowledgement 60, with the call lasting about 10 seconds. A successful call generally corresponds to a message and an acknowledgement being successfully sent and received a first time without the customer device 10 having to resend the same message. As illustrated in FIG. 3, another embodiment of a successful call may include a handshake 40, a first message 50(1), a first acknowledgement 60(1), a second message 50(2), and a second acknowledgement 60(2). As illustrated in FIG. 4, a further embodiment of a successful call may include a handshake 40, a plurality of messages (e.g., 50(1), 50(2), etc.) each followed by one of a plurality of acknowledgements (e.g., 60(1), 60(2), etc.). In other optional embodiments, a call may include even more messages and acknowledgements (e.g., 70 or more), and may last several minutes.

Figure 5:
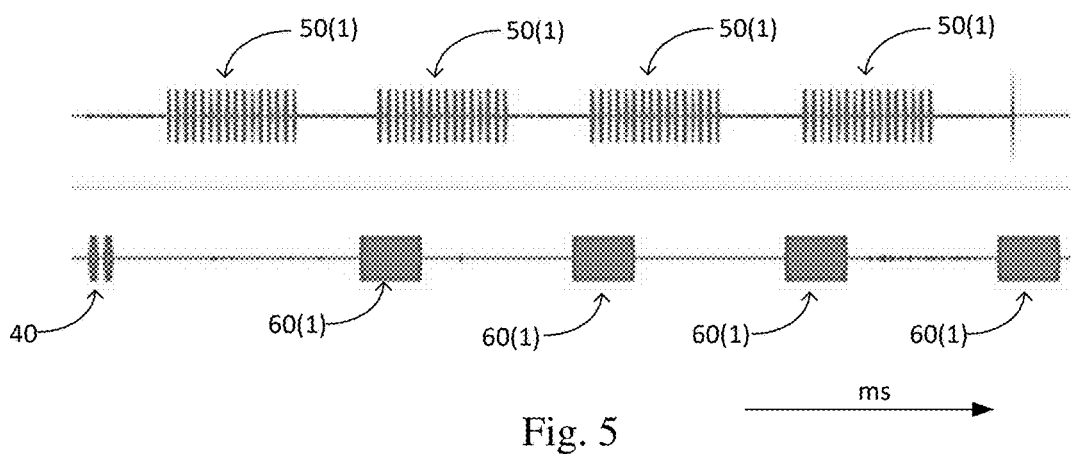
FIG. 5 is a graph of an embodiment of an unsuccessful contact ID waveform in accordance with the present disclosure.

Recently, a significant issue emerged, now referred to as Contact ID Latency (CIL), which posed a challenge for users of a Contact ID protocol. CIL entails a delay occurring between the transmission of a message 50 from the customer device 10 and the reception of an acknowledgment 60 from the CMS 12. As illustrated in FIG. 5, the customer device 10 repeatedly sends the same message 50 despite the receipt of a valid acknowledgment 60 following each transmission. A discerning analysis of FIG. 5 reveals a conspicuous anomaly: the customer device 10 (depicted by the upper portion of FIG. 5) initiates a message retransmission before the completion of the acknowledgment 60 sent by the CMS 12 (depicted by the lower portion of FIG. 5). To offer a contextual comparison of the issue's severity, one can juxtapose the timing discrepancies observed in FIG. 5 with those evident in FIGS. 2-4, portraying instances of favorable outcomes. It is worth noting that during these occurrences, the CMS 12 indeed receives the messages 50 correctly, as evidenced by the dispatched acknowledgments 60 towards the customer device 10. However, the setback lies in their timing, rendering the acknowledgments 60 too tardy for the customer device 10 to effectively correlate them with the previously dispatched message 50.

The solution devised by the herein disclosed system 1 and monitoring system 30 involves the adjustment of the timing for the acknowledgment 60 signal directed toward the customer device 10. In accordance with prior discussions, the successful reception of the message 50 by the CMS 12 of the monitoring company is apparent in FIG. 5, however, the challenge lies in the inability of the customer device 10 to promptly perceive the acknowledgment 60, generally due to timing constraints of the Contact ID protocol, leading the customer device 10 to erroneously assume that the message 50 wasn't received successfully. Through the strategic alteration of the delivery timing of the acknowledgment 60 to the customer device 10, namely the introduction of an additional acknowledgement 62 (e.g., identical or substantially similar to the previously generated and tardily delivered acknowledgment 60), the customer device's comprehension of the successful acknowledgement reception can be effectively established, with very little risk. The additional acknowledgement 62 may also be referred to herein as an infused acknowledgement 62.

Figure 6:
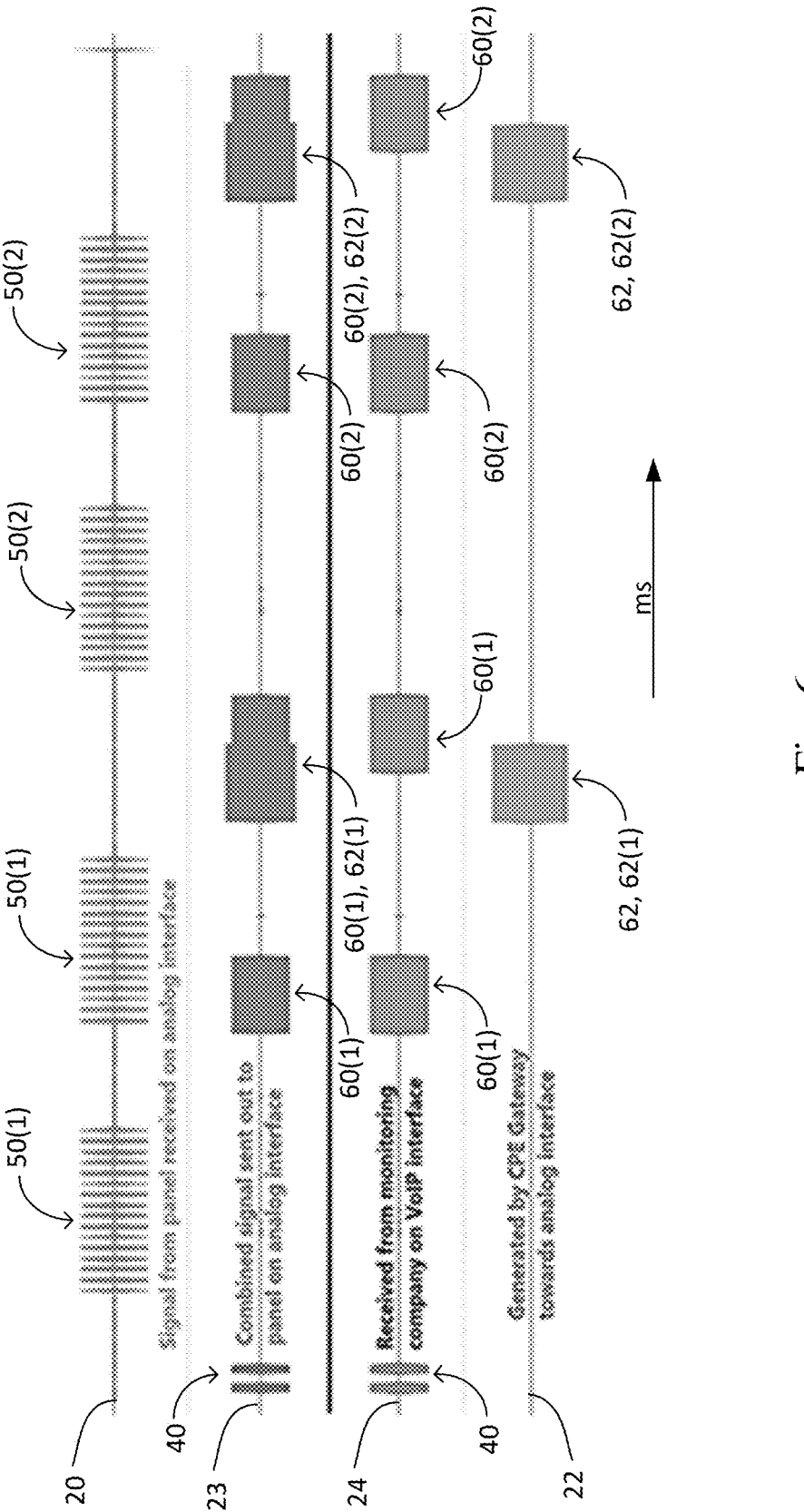
FIG. 6 is a graph of an embodiment of a contact ID waveform with an additional acknowledgement infused therein in accordance with the present disclosure.

This approach necessitates the incorporation of a logical component responsible for multiple tasks: decoding the handshake 40 from the CMS 12, interpreting the message 50 from the customer device 10, detecting the acknowledgement 60 originating from the CMS 12, and infusing an additional acknowledgement 62 into the audio path directed towards the customer device 10, as illustrated in FIG. 6.

The fundamental concept underlying this logic revolves around its capability to monitor the transmitted messages 50 and simultaneously track the corresponding acknowledgments 60. When the logic identifies an acknowledgment 60 for a specific message 50 and subsequently detects that the subsequent message from the panel mirrors the previous one, it can confidently dispatch its own acknowledgment 62 to the customer device 10. This is permissible because the CMS 12 has already acknowledged the identical or substantially similar, previously sent, message.

As a consequence of this process, the duration of calls may be extended twofold since each message 50 is transmitted twice: initially acknowledged by the CMS 12, albeit unheard by the customer device 10, and subsequently acknowledged by both the CMS 12 and the logic (e.g., the monitoring system 30). This dual acknowledgment process allows the customer device 10 to correctly conclude the call or proceed to a subsequent message. To illustrate the nature of such calls, FIG. 6 presents an illustrative waveform depicting the sequence.

As illustrated in FIG. 1, additional details of the system 1 and the monitoring system 30 are shown. The monitoring system 30 may mitigate reporting delays between the customer device 10 and the CMS 12 such that the customer device 10 correctly receives an acknowledgement (e.g., the additional acknowledgement 62) in response a message 50.

The customer device 10 may be owned or operated by one or more of a customer or an alarm monitoring company. Many times, the customer device 10 is an alarm panel. The customer device 10 is the equipment that is waiting to receive a handshake 40 on a customer device receive line 23, 25 from the CMS 12 before transmitting the status and/or events (e.g., messages 50) out via a customer device transmit line 20. Once the message 50 is transmitted, the customer device 10 then waits to receive an acknowledgement 60 on the customer device receive line 23, 25.

The PSTN 11 may be the network traditionally used to pass public phone calls between endpoints, for example, the customer device 10 and the CMS 12. Historically the PSTN 11 switched analog or isochronous time division multiplexed (TDM) circuits to make its connections, however, more recently the PSTN 11 is increasingly comprised of packet voice paths which introduce varying amounts of delay into the communications link, said delay being referred to herein as Contact ID Latency (CIL), as discussed above.

Following the receipt of a call from the customer device 10, the CMS 12 triggers the commencement of status and event exchange. Initially, the CMS 12 dispatches a handshake 40 through its designated transmit line 18 and subsequently enters a waiting phase, anticipating the arrival of a message 50 through its receive line 19. This message 50 is anticipated from the customer device 10. Once the message 50 is received, the CMS 12 responds by transmitting an acknowledgment 60 back through its transmit line 18. This synchronized interaction ensures effective communication between the CMS 12 and the customer device 10, facilitating the seamless exchange of information, at least until CIL began.

The monitoring system 30 may be implemented in hardware, software, or a combination of the two. In certain optional embodiments, the monitoring system 30 may be located at the customer premises connected directly to the analog phone line. The customer premises may be where the customer device 10 is located. In other optional embodiments, the monitoring system 30 may be located at the customer premises contained in a device that translates between analog voice signals and packet voice signals (e.g., as an analog gateway or analog terminal adapter). In further optional embodiments, the monitoring system 30 may be located at the customer premises in a standalone packet-only processing unit that can either be a physical device or a virtual device (e.g. software container running on another physical device). In certain other optional embodiments, the monitoring system 30 may be located other than at the customer premises, for example in a remote location that has a low-latency path to the customer premises, in a standalone packet-only processing unit. In other optional embodiments, the monitoring system 30 may be located other than at the customer premises, for example in a remote location that has a low-latency path to the customer premises and implemented in a device that translates between packet voice signals and time division multiplexed or analog signals (e.g., a PSTN gateway or session border controller). In further optional embodiments, the monitoring system 30 may be located other than at the customer premises, for example in a remote location that has a low-latency path to the customer premises and implemented in a device that acts on TDM or analog signals.

As illustrated, the monitoring system 30 may include a message tone detector 13, an acknowledgement tone detector 15, an acknowledgement tone generator 14, a processor 16, and/or a storage medium 17. The processor 16 may also be referred to herein as a processing unit 16 or processing logic 16. The storage medium 17 may also be referred to herein as a message storage 17.

The message tone detector 13 may be configured to monitor one or more messages 50 sent from the customer device 10 to the CMS 12 over the PSTN 11. The message tone detector 13 may be implemented as a hardware or software solution that listens for single frequency tones and/or dual tone multiple frequency tones on its tap 21 which may be coupled the customer device transmit line 20. The information captured by the message tone detector 13 may be passed to the processor 16 via a processor interface 26. The processor interface 26 may be the interface by which the processor 16 transfers information to and receives information from message tone detector 13.

The acknowledgement tone detector 15 may be configured to monitor one or more acknowledgements 60 sent from the CMS 12 to the customer device 10 in response to each of the one or more messages 50, respectively. The acknowledgement tone detector 15 may be implemented as a hardware or software solution that listens for single frequency tones on its tap 24 which may be coupled to the customer device receive line 25 over the PSTN 11. The information captured by the acknowledgement tone detector 15 may be passed to the processor 16 via a processor interface 28. Note that acknowledgement tone detector 15 may also be used to detect the handshake 40 from the CMS 12.

The acknowledgement tone generator 14 may be configured to generate and transmit one or more additional acknowledgement 62 to the customer device 10. The acknowledgement tone generator 14 may be implemented as a hardware or software solution that receives a signal from the processor 16 via processor interface 27 and generates a single frequency tone on its tap 22 which may be coupled to the customer device receive line 25, injecting the tone (e.g., the additional acknowledgement 62) into the customer device receive line 23 to the customer device 10.

The customer device receive line 23, 25 may be one in the same, however, are labeled as such to demarcate a portion of said line before and after the tap 22 whereby the additional acknowledgement 62 may be introduced into the customer device receive line 25 to define the customer device receive line 23 with said optional additional signal. As such, the customer device receive line 23 may transmit a signal which is a summation of a signal from customer device receive line 25 and a signal (e.g., the additional acknowledgement 62) from the acknowledgement tone generator 14 via tap 22. It's this signal (e.g., on the customer device receive line 23) that is presented to the customer device 10 and which is meant to resolve any delay or latency occurring between the CMS 12 and the customer device 10 due to the PSTN 11.

As illustrated in FIG. 6, the messages 50(1), 50(2) are transmitted to the CMS 12 on the customer device transmit line 20. The handshake and acknowledgements 60(1), 60(2) may be transmitted to the customer device 10 on the customer device receive line 23, 25 and monitored by the acknowledgement tone detector 15 via its tap 24. The tap 24 may be coupled to the customer device receive line 25 before the tap 22 of the acknowledgement tone generator 14, and as such is virtually identical to the customer device receive line 25. The one or more additional acknowledgements 62 may be injected into the customer device receive line 25 via tap 22 to define the combined signals on the customer device receive line 23.

As illustrated in FIG. 1, the PSTN 11 may separate the customer device transmit line 20 from the CMS receive line 19. Signals (e.g., messages 50) from the customer device 10 may undergo packetization via the PSTN 11, and thus incur delays, prior to arriving at the CMS 12 via the CMS receive line 19. Packetization in the context of the PSTN 11 refers to the process of converting traditional analog voice signals or time division multiplexed digital signals into digital packets for transmission over modem data networks. Similarly, the PSTN 11 may separate the CMS transmit line 18 from the customer device receive line 25. The signals (e.g., acknowledgements 60) on the customer device receive line 25 are often delayed from those on the CMS transmit line 18, as discussed above with reference to FIG. 5.

The processor 16 may be configured to receive the monitored one or more messages 50 and the monitored one or more acknowledgements 60. The processor 16 may further be configured to cause the acknowledgement tone generator 14 to generate and transmit the one or more additional acknowledgements 62 to the customer device 10 when two consecutive messages of the one or more messages 50 are substantially similar or identical. The processor 16 may cause the acknowledgement tone generator 14 to generate and transmit the one or more additional acknowledgements 62 at the precise moment needed to circumnavigate the latency issues and cause the customer device 10 to properly receive the one or more additional acknowledgements 62.

The storage medium 17 may be configured to store the one or more messages 50 detected by the message tone detector 13 and sent to the processor 16. The processor 16 may be configured to retrieve a message for comparison with the next message detected by the message tone detector 13. If the next message is the same, then the processor 16 may cause the acknowledgement tone generator 14 to generate and transmit the one or more additional acknowledgements 62. If the next message is different, then the processor 16 may clear the previous message from the storage and save the most recent message for later comparison. The storage medium 17 may be coupled to the processor via a processor interface 29. The processor interface 29 may be the interface by which the processor 16 transfers information to and receives information from storage medium 17.

Figure 7:
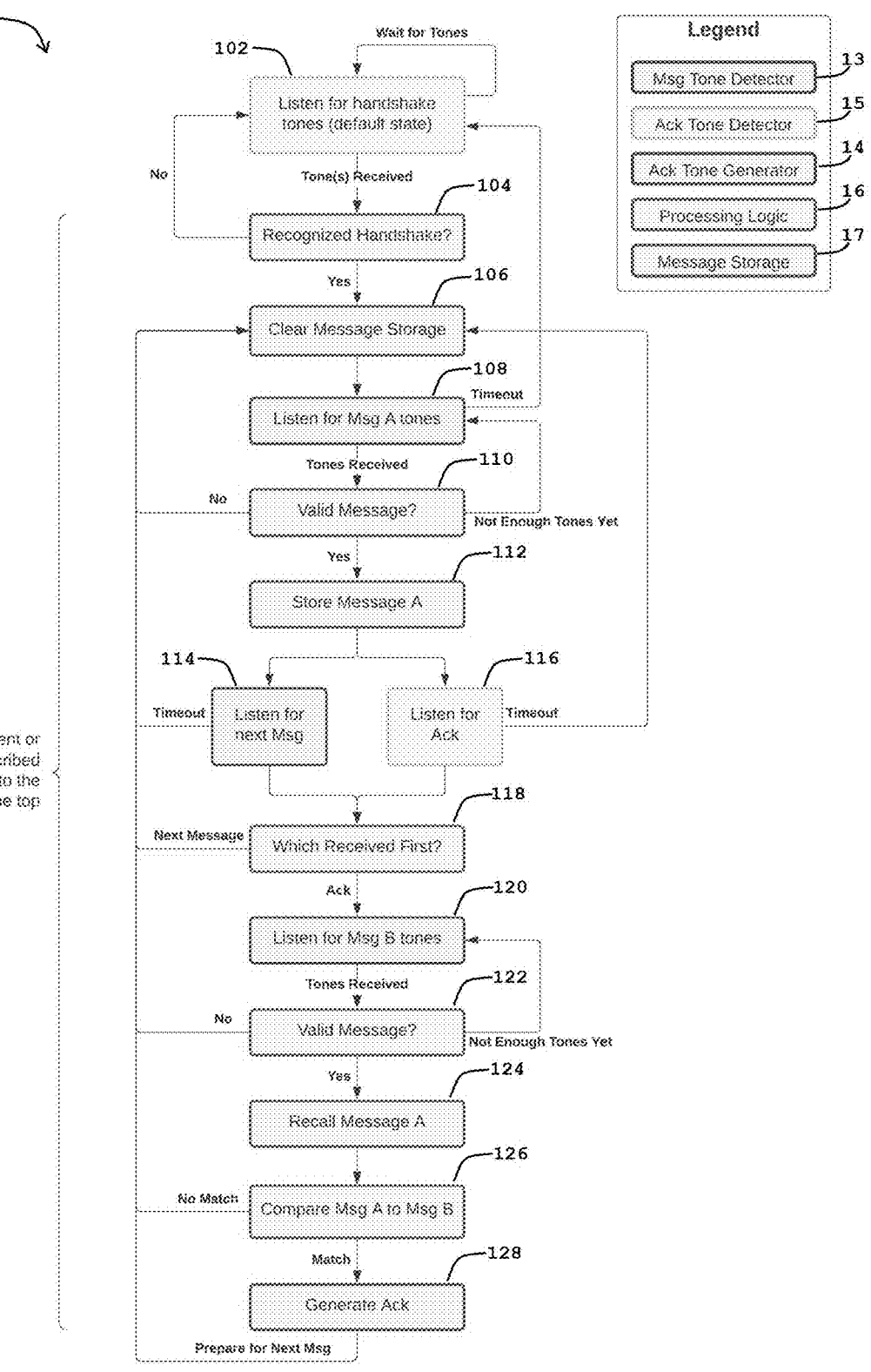
FIG. 7 is a flowchart of a state diagram of an embodiment of software used by the monitoring system of FIG. 1 in accordance with the present disclosure.

Referring to FIG. 7, a state diagram 100 for software used by the monitoring system 30 or a like device. The acknowledgement tone detector 15 may listen 102 for the handshake 40. The software will then determine 104 if the handshake 40 was recognized. If so, the storage medium 17 will be cleared 106, after which time the message tone detector 13 will listen 108 for a message 50 (e.g., a first message or "Msg A"). Next, the processor 16 determines 110 if the message is valid. If the message is valid, then the processor 16 directs 112 the storage medium 17 to store the message. Next, simultaneously, the message tone detector 13 listens 114 for a next message and the acknowledgement tone detector 15 listens 116 for an acknowledgement 60. The processor 16 then determines 118 which was received first. If the next message was received by the message tone detector 13 first, then the state diagram goes back to step 106 and clears the storage medium 17. If the acknowledgement 60 was received by the acknowledgement tone detector 15 first, then the message tone detector 13 listens 120 for the next message (e.g., a second message or "Msg B"). The processor 16 then determines 122 if the message is valid. If so, the message (e.g., "Msg A") is recalled 124 from the storage medium 17 and then the processor 16 compares 126 the message (e.g., "Msg A") with the next message (e.g., "Msg B"). If the messages match (e.g., are substantially similar or identical), then the processor 16 directs the acknowledgement tone generator 14 to generate 128 the additional acknowledgement 62. The message (e.g., "Msg A") may also be referred to herein as a first message, next message (e.g., "Msg B") may also be referred to herein as a resent first message.

Referring to FIG. 8, a method 200 overcoming latency issues between the customer device 10 and the CMS 12 over a public switched telephone network (PSTN) 11. The method 200 may include step (a) sensing 202 a first customer device message 50(1) sent from the customer device 10 to the CMS 12 using a monitoring system 30. The method 200 may further include step (b) sensing 204 a first CMS acknowledgement 60(1) sent from the CMS 12 to the customer device 10 in response to the first customer device message 50(1) using the monitoring system 30. The method 200 may further include step (c) sensing 206 a second message sent from the customer device 10 to the CMS 12 using the monitoring system 30, the second message being either a second customer device message 50(2) or a second instance of the first customer device message 50(1) (also referred to herein as a resent first message). The method 200 may further include step (d) comparing 208 the first customer device message 50(1) with the sensed second message using the monitoring system 30. The method 200 may further include step (e) generating 210 an additional acknowledgement 62 using the monitoring system 30 when the second message is substantially similar to the first customer device message 50(1) (e.g., when the second message is a second instance of the first customer device message 50(1)). The method 200 may further include step (f) transmitting 212 the additional acknowledgement 62 from the monitoring system 30 to the customer device 10 within a predetermined time period following the second message (e.g., the second instance of the first customer device message 50(1)).

In certain optional embodiments, the method 200 may further include, between step (a) and step (b), storing the first customer device message 50(1) on a storage medium 17 of the monitoring system 30. In other optional embodiments, step (d) of the method 200 may further include retrieving the first customer device message 50(1) from the storage medium 17 using a processor 16 of the monitoring system 30. In further optional embodiments, the method 200 may further include clearing the first customer device message 50(1) from the storage medium 17 following step (f).

In certain optional embodiments, the method 200 may further include clearing the first customer device message 50(1) from the storage medium 17 following step (d) when the second message is different from the first customer device message 50(1) and storing the second message on the storage medium 17 as the second customer device message 50(2). In other optional embodiments, the method 200 may further include sensing a third message sent from the customer device to the CMS using the monitoring system, the third message being either a third customer device message 50(3) or a second instance of the second customer device message 50(2); comparing the second customer device message with the third message using the monitoring system; generating the additional acknowledgement using the monitoring system when the third message is substantially similar to the second customer device message (e.g., when the third message is a second instance of the second customer device message 50(2)); and transmitting the additional acknowledgement from the monitoring system to the customer device within the predetermined time period following the third message (e.g., the second instance of the second customer device message 50(2)). In some embodiments, the method 200 may further include sensing a plurality of additional messages, each of which may be a repeat of a previous message or a new message. For each of the plurality of additional messages, the method 200 may perform steps similar to those performed with response to the second and third messages, as discussed above.

In certain optional embodiments, step (d) of the method 200 may be performed using a processor 16 of the monitoring system 30.

In certain optional embodiments, the additional acknowledgement 62 may be substantially similar to the first CMS acknowledgement 60(1).

In certain optional embodiments, the monitoring system 30 may be coupled to a transmission line (e.g., the customer device transmit line 20, the customer device receive line 23, 25, or the like.) of the PSTN 11 between the customer device 10 and the CMS 12.

In certain optional embodiments, the predetermined time period may be less than or equal to approximately 1.25 seconds beginning upon transmission of the second message from the customer device (e.g., before the customer device 10 sends another message due to not receiving an acknowledgement). In some optional embodiments, the predetermined time period may be less than approximately 1.1 seconds beginning upon transmission of the second customer device message from the customer device. In other optional embodiments, the predetermined time period may be less than approximately 1.0 second beginning upon transmission of the second customer device message from the customer device. In further optional embodiments, the predetermined time period may be less than approximately 900 milliseconds beginning upon transmission of the second customer device message from the customer device. In further optional embodiments, the predetermined time period may be less than approximately 800 milliseconds beginning upon transmission of the second customer device message from the customer device. In further optional embodiments, the predetermined time period may be less than approximately 700 milliseconds beginning upon transmission of the second customer device message from the customer device. In further optional embodiments, the predetermined time period may be less than approximately 600 milliseconds beginning upon transmission of the second customer device message from the customer device. In further optional embodiments, the predetermined time period may be less than approximately 500 milliseconds beginning upon transmission of the second customer device message from the customer device.

The method 200 may repeat repeatedly for each of the one or more messages (e.g., 50(1), 50(2), . . . 50(n)). As illustrated in FIGS. 2-6, the customer device 10 may send between one message and any number (n) of message, where n is an integer. Each message that suffers from latency issues may be sent twice, with the monitoring system 30 injecting the additional acknowledgement 62 the second time.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of new and useful systems and methods dynamically providing content, it is not intended that such references be construed as limitations upon the scope of this disclosure.

What is claimed is:

1. A monitoring system for mitigating reporting delays between a customer device and a central monitoring station (CMS) over a public switched telephone network (PSTN), the monitoring system comprising:
   a message tone detector configured to monitor one or more messages sent from the customer device to the CMS;
   an acknowledgement tone detector configured to monitor one or more acknowledgements sent from the CMS to the customer device in response to each of the one or more messages, respectively;
   an acknowledgement tone generator configured to generate and transmit one or more additional acknowledgements to the customer device; and
   a processing unit configured to receive the monitored one or more messages and the monitored one or more acknowledgements, the processing unit further configured to direct the acknowledgement tone generator to generate and transmit the one or more additional acknowledgements to the customer device in response to detecting the one or more acknowledgements from the CMS when two consecutive messages of the one or more messages are substantially similar.

2. The monitoring system of claim 1, wherein:
the two consecutive messages comprise a first message and a resent first message; and
the processing unit is configured to save the first message to a storage medium of the monitoring system, recall the first message from the storage medium, and compare the first message to the resent first message.

3. The monitoring system of claim 2, wherein:
the one or more acknowledgements includes a first acknowledgement sent from the CMS to the customer device in response to each of the first message and the resent first message; and
the one or more additional acknowledgements includes a first additional acknowledgement sent from the acknowledgement tone generator to the customer device in response to the resent first message.

4. The monitoring system of claim 3, wherein:
the processing unit is configured to clear the first message from the storage medium upon receiving the first acknowledgement from the CMS followed by a second message of the one or more messages from the customer device, the second message being different than the first message.

5. The monitoring system of claim 3, wherein:
the processing unit is configured to clear the first message from the storage medium upon transmitting the first additional acknowledgement from the acknowledgement tone generator.

6. The monitoring system of claim 2, wherein:
the processing unit is configured to save a first acknowledgement to the storage medium and to direct the acknowledgement tone generator to generate and transmit a first additional acknowledgement to the customer device in response to the resent first message.

7. The monitoring system of claim 6, wherein:
the first additional acknowledgement is substantially similar to the first acknowledgement saved to the storage medium.

8. The monitoring system of claim 1, wherein:
the monitoring system is coupled to the PSTN closer to the customer device than to the CMS.

9. The monitoring system of claim 1, wherein:
the monitoring system is positioned such as to have a low-latency path to the customer device.

10. The monitoring system of claim 1, wherein:
the monitoring system is defined as a self-contained device.

11. A method of overcoming Contact ID latency issues between a customer device and a central monitoring station (CMS) over a public switched telephone network (PSTN), the method comprising:
   (a) sensing a first customer device message sent from the customer device to the CMS using a monitoring system;
   (b) sensing a first CMS acknowledgement sent from the CMS to the customer device in response to the first customer device message using the monitoring system, the first CMS acknowledgement being delayed;
   (c) sensing a second message sent from the customer device to the CMS using the monitoring system, the second message being either a second customer device message or a second instance of the first customer device message;

(d) comparing the first customer device message with the second message using the monitoring system;

(e) generating an additional acknowledgement using the monitoring system when the sensed second message is substantially similar to the first customer device message; and (f) transmitting the additional acknowledgement from the monitoring system to the customer device within a predetermined time period following the second message.

12. The method of claim 11, wherein between step (a) and step (b), the method further comprises:

storing the first customer device message on a storage medium of the monitoring system.

13. The method of claim 12, wherein step (d) further comprises:

retrieving the first customer device message from the storage medium using a processor of the monitoring system.

14. The method of claim 12, further comprising:

clearing the first customer device message from the storage medium following step (f).

15. The method of claim 12, further comprising:

clearing the first customer device message from the storage medium following step (d) when the second message is different from the first customer device message; and storing the second message on the storage medium as the second customer device message.

16. The method of claim 15, further comprising:

sensing a third message sent from the customer device to the CMS using the monitoring system, the third message being either a third customer device message or a second instance of the second customer device message;

comparing the second customer device message with the third message using the monitoring system;

generating the additional acknowledgement using the monitoring system when the third message is substantially similar to the second customer device message; and transmitting the additional acknowledgement from the monitoring system to the customer device within the predetermined time period following the third message.

17. The method of claim 11, wherein step (d) is performed using a processor of the monitoring system.

18. The method of claim 11, wherein the additional acknowledgement is substantially similar to the first CMS acknowledgement.

19. The method of claim 11, wherein the monitoring system is coupled to a transmission line of the PSTN between the customer device and the CMS.

20. The method of claim 11, wherein the predetermined time period is less than approximately 1.25 seconds beginning upon transmission of the second message from the customer device.

* * * * *